United States Patent [19]

Gobin

[11] 4,214,424
[45] Jul. 29, 1980

[54] CATCHER SECUREMENT FOR REAR BAGGER

[75] Inventor: Donald L. Gobin, Savannah, Ga.

[73] Assignee: Roper Corporation, Kankakee, Ill.

[21] Appl. No.: 5,363

[22] Filed: Jan. 22, 1979

[51] Int. Cl.² ........................................... A01D 35/22
[52] U.S. Cl. ..................................... 56/202; 56/16.6
[58] Field of Search ................................. 56/202, 16.6

[56] References Cited

U.S. PATENT DOCUMENTS

| | | | |
|---|---|---|---|
| 3,893,284 | 7/1975 | Thon et al. | 56/202 |
| 3,928,956 | 12/1975 | Boyer | 56/202 |
| 3,949,540 | 4/1976 | Christopherson et al. | 56/202 |
| 3,962,852 | 6/1976 | Boyer | 56/202 |
| 4,031,694 | 6/1977 | Gobin | 56/202 |
| 4,043,102 | 8/1977 | Uhlinger et al. | 56/202 X |

Primary Examiner—Russell R. Kinsey
Attorney, Agent, or Firm—C. Frederick Leydig; Richard L. Voit; David J. Richter

[57] ABSTRACT

A rotary mower having an inverted housing with a discharge opening formed in the rear surface thereof, the opening having a cover plate which is hinged at the rear edge of the housing and biased into a normally closing position. The plate has a pair of integral arms projecting beyond the hinge at its lateral edges. A pair of parallel guide plates are secured to the housing in positions closely alongside the respective arms, the guide plates having angled but parallel slots extending forwardly and downwardly therein. A grass catcher is provided having a mouth dimensioned to receive the cover plate and including a support bar spaced horizontally above the mouth, the support bar, upon insertion into the slots, serving to engage the arms for progressively swinging of the cover plate into a horizontally extending position within the catcher. The arms are provided with radially facing notches complimentary to the bottoms of the respective slots for latching the bar captive with the catcher in its receiving position. A third arm is provided on the cover plate extending beyond the first two arms for purposes of manual release.

7 Claims, 9 Drawing Figures

CATCHER SECUREMENT FOR REAR BAGGER

It is known to provide a rotary mower with a rear discharge opening which is normally enclosed by a cover plate and with provision for moving the cover plate to an out-of-the-way position when a grass catcher is attached to the mower thereby to provide direct access of clippings into the catcher. It is an object of the present invention to provide an improved actuating mechanism for such a cover plate which is automatically operated to move the cover plate out of its enclosing position incident to attaching the catcher to the mower housing and to automatically restore the cover plate to its enclosing position when the catcher is removed. It is, therefore, an object to provide a rotary mower assembly including a mower housing having a rear discharge opening communicating with a catcher which provides for simple and easy attachment of the catcher but which is inherently safe, insuring that the discharge opening is tightly enclosed, thereby preventing either discharge of a missile from the housing, or entry of the operator's foot, or the like, into the housing when the catcher is removed from its operating position.

It is a more specific object of the invention to provide a mechanism for mounting a grass catcher on the mower which is simple to use and which does not require any special instruction or precaution, involving only the insertion of a supporting bar in a naturally and conveniently placed receptacle, in the form of a pair of slots, and with automatic, interlocked operation of the cover plate which normally encloses the discharge opening. In this connection it is an object to provide a mounting means for a grass catcher in which the catcher is positively locked in operating position in which there is free entry of the clippings but with provision for quick and easy release.

It is yet another object of the present invention to provide a mower assembly including a rotary mower and grass catcher for rear discharge which is not only convenient and safe but which is highly economical, being formed of a minimum number of parts. It is a related object to provide a catcher attaching and release mechanism meeting all of the requirements of convenience, safety and cost and which may be utilized in existing as well as in new designs of rotary mowers of the rear discharge type.

Other features and advantages of the construction will be apparent upon reading the attached detailed description and upon reference to the drawings in which:

FIGS. 5a-5c are a series of stop motion view taken along vertical section 5—5 in FIG. 3 in which FIG. 5a shows the initial insertion of the support bar into the receiving slots, FIG. 5b shows the bar at the half-way point, and FIG. 5c shows final locking of the bar in operating position.

While the invention has been described in connection with a preferred embodiment, it will be understood that we do not intend to be limited to the particular embodiment shown but intend, on the contrary, to cover the various alternative and equivalent construction included within the spirit and scope of the appended claims.

Figure 1:
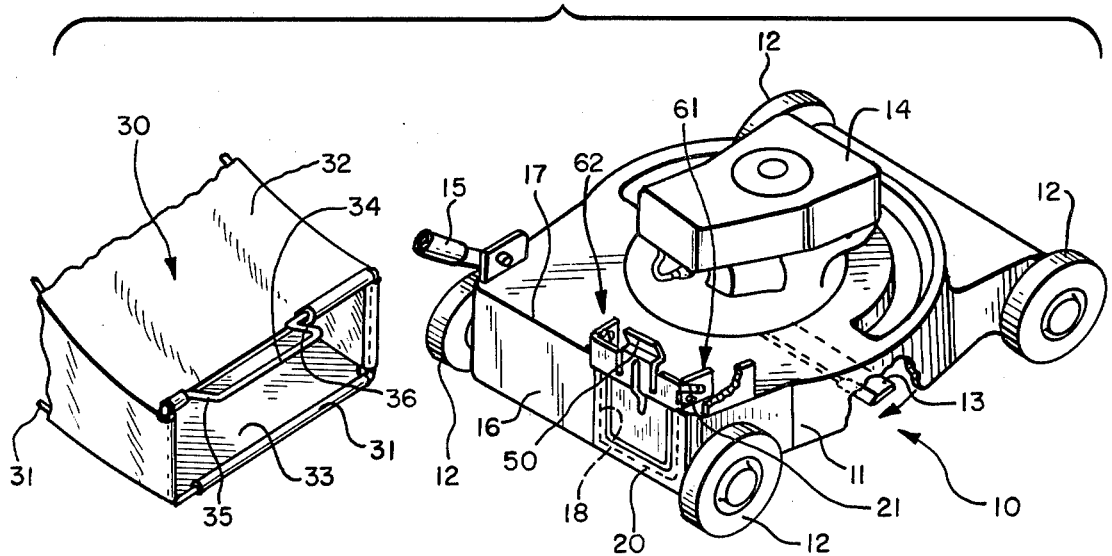
FIG. 1 is a perspective view, partly fragmentary, of a rotary mower with rear discharge opening and cover plate and showing the cooperating grass catcher prior to assembly on the mower.
Figure 1A:
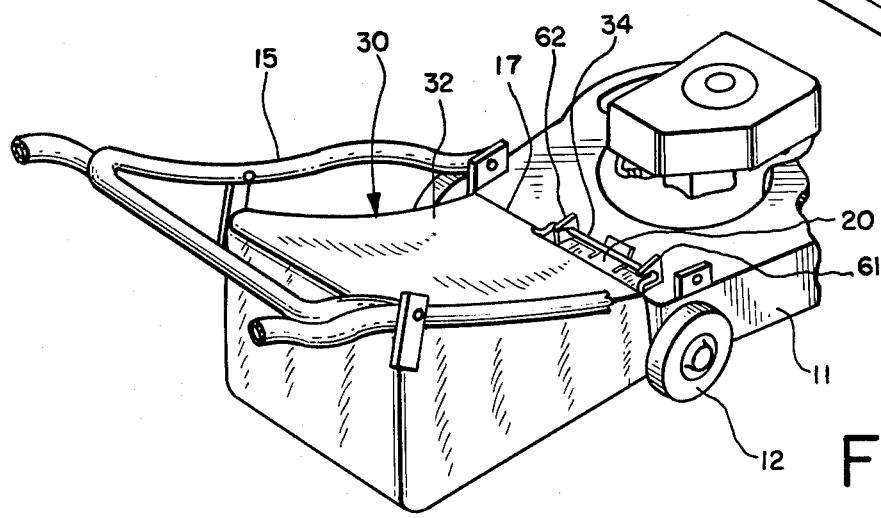
FIG. 1a shows the catcher in assembled relation.

Turning now to FIGS. 1 and 1a there is shown a rotary mower 10 having an inverted housing 11 supported upon a set of ground wheels 12. Rotatably mounted within the housing is a blade 13 driven by an engine 14. The mower is propelled and guided by means of a handle 15.

The vertical rear surface 16 of the housing, bounded by a rear edge 17, includes, at the right-hand side, a discharge opening 18 normally closed by cover plate 20. The cover plate is hinged upon a hinge pin 21 which is arranged adjacent and parallel to the edge 17 of the housing. The plate is biased by a spring 22 (see FIGS. 2 and 3) into the closed position illustrated in FIG. 1 during times when no catcher is attached.

The catcher, indicated at 30, has a frame 31 carrying a bag 32 and defining a forwardly facing mouth 33, the mouth being dimensioned to fit over, and accommodate, the cover plate 20. The mouth opening extends over the entire frontal area of the catcher to facilitate later emptying. The frame 31 includes a support bar 34 having side legs 35, 36 to form a loop of inverted "U" shape, the bar being spaced forwardly of, and slightly above, the mouth 33.

In carrying out the present invention, the cover plate 20 has a pair of integral arms projecting along the lateral edges of the plate beyond the hinge pin and presenting operating surfaces substantially in the plane of the plate. A pair of parallel guide plates are secured to the top of the housing adjacent the rear edge thereof in vertically extending position, the guide plates being closely spaced alongside of the respective arms. The guide plates have angled parallel slots formed therein extending downwardly from their rear edges to a point forwardly of the hinge and which is substantially at hinge level, the pair of arms having rearwardly facing notches at their ends which complement the bottoms of the respective slots so that when the bar on the catcher is registered with the slots and pressed forwardly therein, the bar engages the operating surfaces on the arms for swinging the cover plate into horizontal position as the bar reaches the bottoms of the slots where it is latched in captive position by the notches.

Figure 2:
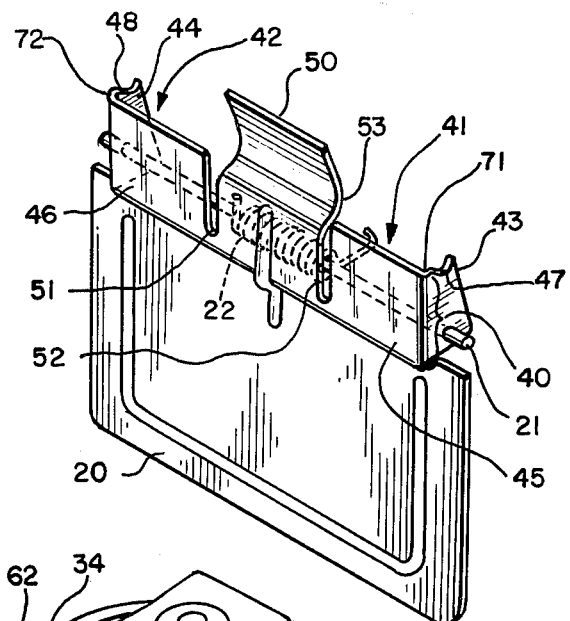
FIG. 2 shows the cover plate in perspective.

Thus as illustrated in FIG. 2 the cover plate 20 has an integral extension 40 extending upwardly beyond the hinge and forming side, or "operating" arms 41, 42. The arms are reinforced by wings or tabs 43, 44, respectively, bent forwardly at right angles from the plane of the plate, the operating surfaces on the arms being indicated at 45, 56, respectively, the two arms being mirror images of one another. Each arm is formed at its remote end with a radially facing notch as indicated at 47, 48. A third arm 50, bounded by slits 51, 52, and having a transversely extending pocket 53, occupies a centrally located position and is used for the purpose of release, or unlatching, as will be made clear.

Figure 3:
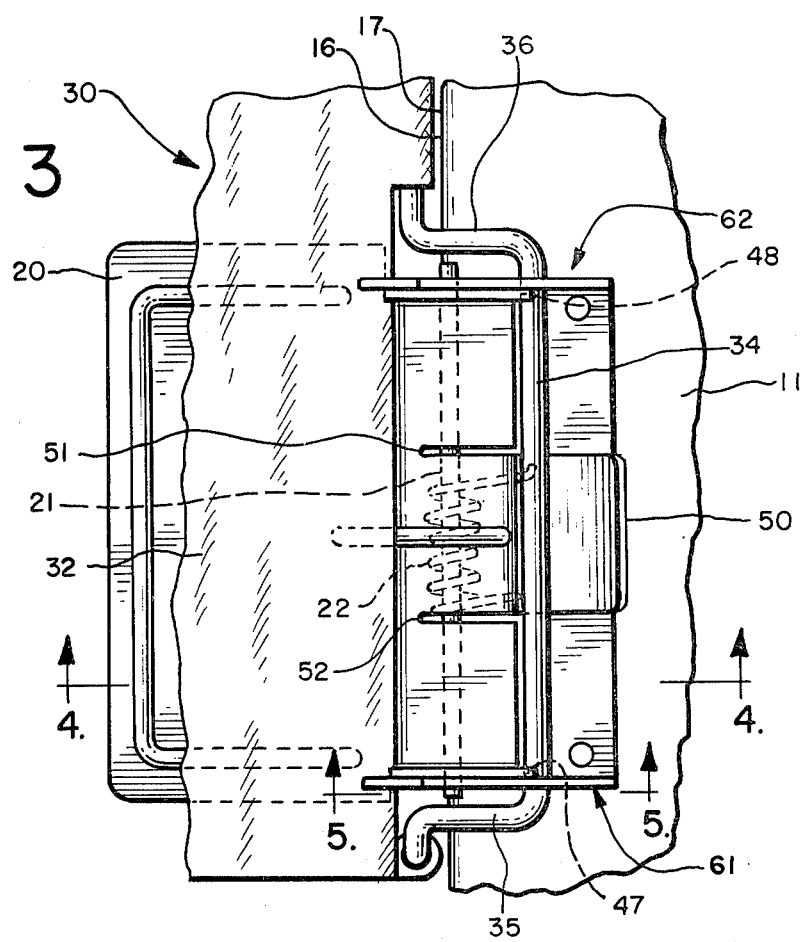
FIG. 3 is a fragmentary top view of the attachment mechanism with the catcher in place and with the cover plate swung into its horizontal position.
Figure 5A:
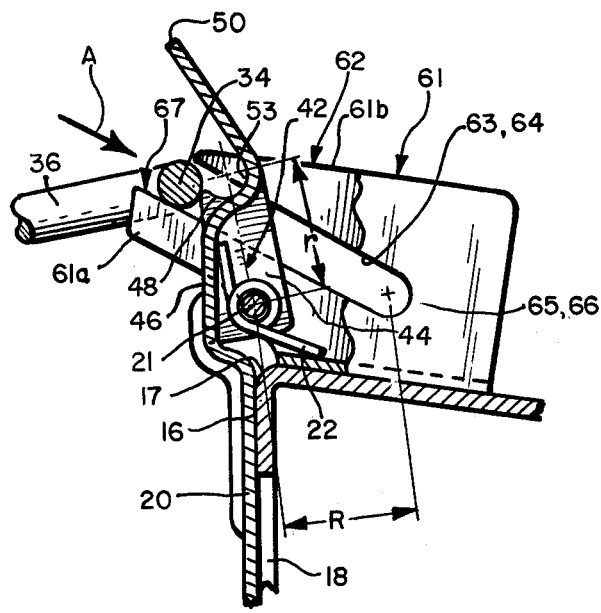

In carrying out the invention vertical guide plates 61, 62, which may be separate plates or formed at opposite ends of a single piece of metal, are secured adjacent the rear edge 17 of the housing, parallel to one another, and closely alongside of the arms 41, 42. These guide plates have angled but parallel slots 63, 64. The slots, which have respective bottom portions 65, 66 serve to separate the guide plates into lower and upper portions; for example, the guide plate 61 shown in FIG. 5a is separated into a lower portion 61a and an upper portion 61b. The notches 47, 48 have a center located at a radius $r$ from the axis of hinge pin 21. The bottom portions of the cooperating slots, indicated at 65, 66, have a center which lies at a radius $R$ (FIG. 5a), which is substantially equal to, and preferably slightly exceeds, $r$. For the purpose of accurate lateral positioning, the side legs 35, 36 of the supporting bar 34 are spaced to closely straddle the guide member 61, 62, respectively, as shown in FIG. 3.

Figure 4:
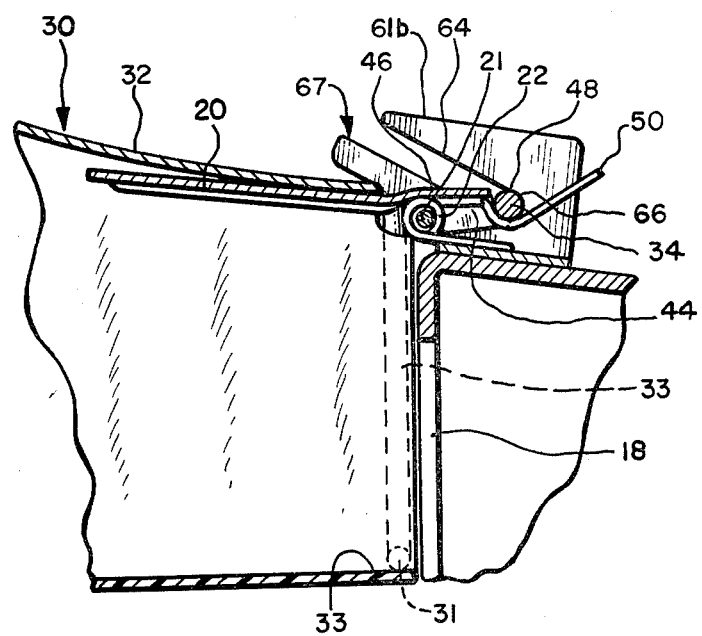
FIG. 4 is a fragmentary vertical section taken along line 4—4 in FIG. 3.
Figure 5B:
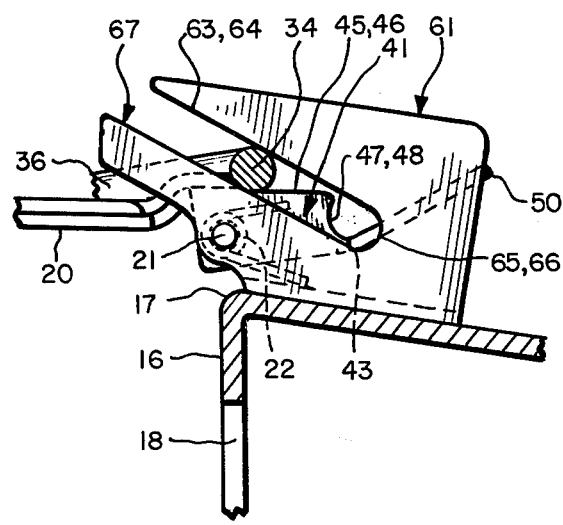
Figure 5C:
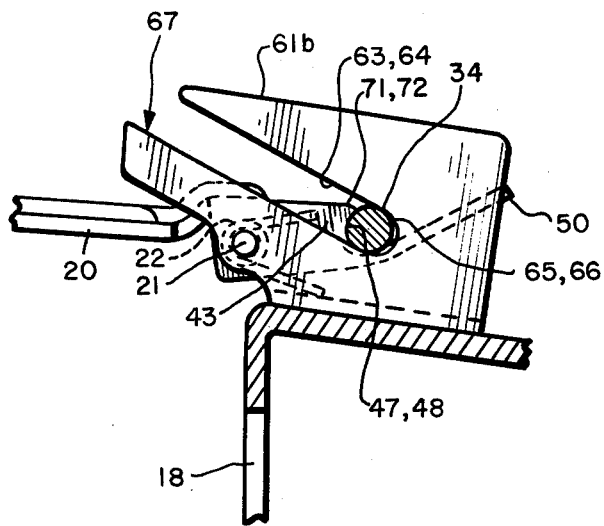

In accordance with one of the more detailed features of the invention, the lower portions 61a, 6a of the guide members are extended rearwardly beyond the upper portions of the guide members to form an exposed supporting ledge 67 or "porch" which serves as a temporary support for the bar 34 during the initial portion of the assembly illustrated in FIGS. 5a–5c. Thus, to assemble, the bar 34 is placed upon the ledge 67 in a position indicated by the outline and with the side members of the bar adjacent the respective guide plates 61, 62. The bar is then slid forwardly in the direction of the arrow A, down the slots, until the bar strikes the operating surfaces 45, 46 on the arms 41, 42. Continued movement of the bar is accompanied by forward swinging of the arms, as shown in FIG. 5b, against the restoring force of the spring 22. Such movement is continued until the bar 34 is seated at the ends 65, 66 of the slots. In the course of bottoming, the bar 34 proceeds slightly beyond the profile of notches 47, 48, radius $R$ being preferably greater than radius $r$, so that the bar clears the edges 71, 72 (FIG. 2) permitting the arms to undergo slight retrograde (upward) swinging movement under the urging of the biasing spring 22 so that the bar is latched in captive position between the notches 47, 48 and the adjacent inner edges of the slots. Thus the frame of the grass catcher is locked in place on the mower with the cover plate in the upraised, substantially horizontal position as illustrated in FIG. 4. This provides clear and uninterrupted flow of the clippings from the blade 13 through the opening 18 at the rear of the mower and into the mouth 33 of the catcher. It is to be noted that necessary clearance to permit bar 34 to proceed in its latched position may be provided even if radii $R$ and $r$ are equal by increasing the radial dimension of the notches 47, 48 and/or the radius of slot ends 65, 66 relative to the radial thickness of bar 34.

It is one of the features of the construction that the bottoms 65, 66 of the slots are located substantially at hinge level, with the result that relatively short inward sliding movement of the supporting bar 34, acting upon the operating surfaces 45, 46 of the arms, is effective to swing the cover plate through a full 90 degrees of arc into its horizontal, non-obstructing position. It will also be noted as a feature of the invention that assembly comes about as a simple and natural move: The presented ledge 67 (FIG. 5a) and the slots which extend beyond it, as well as the matched spacing between the guide plates and the sides of the supporting bar, literally "invite" the user to place the bar on the ledge and to slide it into position without any special instruction being required or without reference to any operating manual.

Release is equally simple: The integral release arm 50, extending as it does beyond the operating arms 41, 42 in centrally located position presents an extensive upwardly facing surface which seems to invite manual pressing. Indeed, because of the clean design the release arm 50 is the only available "pressable" element in sight so that its operation is obvious.

Figure 5D:
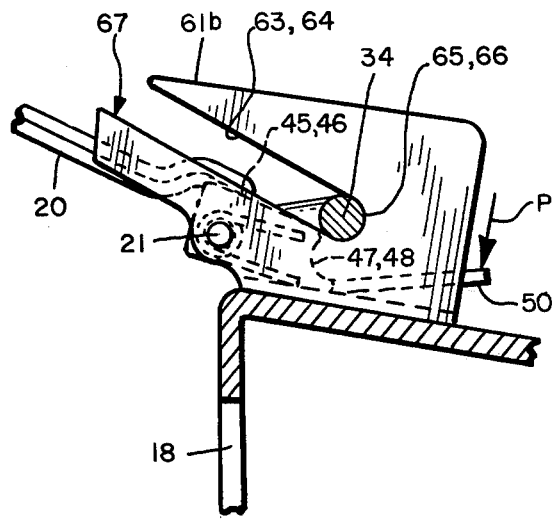
FIG. 5d is a view similar to FIG. 5c but showing release of the supporting bar for retraction from the slots.

Thus when the arm 50 is rocked by applying a generally downward pressure P against the restoring force of the biasing spring, the bar 34 is released from captivity (FIG. 5d), following which the catcher may be removed by grasping the catcher and drawing its supporting bar clear of the slots. Just as soon as the supporting bar undergoes initial movement from the bottom of the slots, the pressure P may be released so that the operating surfaces 45, 46 re-engage the front side of the bar, with the result that the biasing spring assists in "ejecting" the bar evenly and free of any cocking action.

Simultaneously with the withdrawal of the bar 34 the cover plate 20 is restored to its vertical enclosing position by the biasing action of spring 22.

It will be seen, then, that the device is eminently safe in at least two respects. In the first place the catcher, once its supporting bar has been latched in position, is firmly held in close-coupled position with respect to the mower housing, forming a unit therewith, until intentionally released. Thus even though the opening 18 in the mower housing is fully open (FIG. 4), the catcher itself serves as a shield against discharge of missiles or against accidental access to the blade. In addition, once the release arm 50 has been pressed, permitting disengagement of the catcher, as the catcher moves away from the housing, the initial portion of the supporting movement is accompanied by closing of the cover plate which occurs inevitably and automtically without thought by the operator, so that by the time a substantial gap exists between the two units the cover plate is in its fully enclosing condition.

While the invention has been described in connection with a flat cover plate, it will be understood that the term "planar" is not limited to a perfectly flat plate but includes plates having minor curvature to conform to a curved rear wall of the housing. Also while the third, or release, arm 50 is shown symmetrically centered between the operating arms, the release arm may, if desired, be moved off-side in one direction or the other without affecting its utility; indeed, the arm 50 may be formed as an extension of one of the two operating arms 41, 42 without departing from the invention.

Further, while it is one of the advantages of the disclosed construction that the slots are elongated to provide positive guidance of the support bar 34 from a point of entry adjacent the rear edge of the guide plates to a final bottoming position, it will be understood that the invention is not limited to a slot of any particular length and that the upper portion (see 61b, FIG. 5a) of the guide plates may be foreshortened within the scope of the invention and without sacrificing the main benefits of the disclosed structure.

Finally, while the invention is primarily intended for a closable cover plate located on the back surface of a rotary mower housing, it will be apparent that the invention is equally applicable to such cover plate and associated catcher structure in mowers of the side discharge type. Thus the terms "front" and "rear" and "forwardly" and "rearwardly" will be understood to be relative terms generic to the two positions.

What I claim is:

1. In a rotary mower assembly, the combination comprising a mower having an inverted housing containing a rotary blade with means on the housing for driving the blade, the housing having a rear edge and a planar rear surface adjacent thereto having an extensive discharge opening, a substantially flat cover plate dimensioned to cover the opening, hinge means located at the rear edge of the housing for hingeing the cover plate for swinging movement between a vertical closing position and an upraised, substantially horizontal open position, means for biasing the cover plate to its closing position, the plate having a pair of integral arms projecting upwardly adjacent the lateral edges of the plate and presenting operating surfaces substantially in the plane of the plate, a pair of parallel guide plates secured to the top of the housing adjacent the rear edge thereof in vertically extending position, the guide plates being closely spaced alongside of the respective arms, the guide plates having angled but parallel slots formed therein accessible from their rear edges and extending forwardly and downwardly to a bottom portion spaced forwardly of the hinge and substantially at hinge level, a grass catcher having a frame defining a mouth dimensioned to accommodate the cover plate and including a support bar spaced forwardly from the mouth and parallel thereto, the pair of arms having respective notches at their ends, the notches being rearwardly facing when the arms are in vertical position, the notches being complementary to the bottom portions of the respective slots so that when the bar on the catcher is registered with the slots and pressed forwardly therein the bar engages the operating surfaces on the arms for progressively swinging the cover plate into horizontal position until the bar reaches the bottom portions of the slots where it is latched captive between the notches and the respective slots thereby attaching the grass catcher to the mower and holding the cover plate in an open position to create a path for discharge of clippings into the mouth of the bag.

2. The combination as claimed in claim 1, the cover plate having a third arm radially extending beyond the first two arms into a manually accessible position so that manual pressure applied to the third arm rocks the plate and pair of arms to disengage the notches from the bar permitting the bar and the catcher which is secured thereto to be drawn rearwardly clear of the slots for purposes of emptying.

3. The combination as claimed in claim 1 in which the cover plate has an integral extension extending upwardly beyond the hinge, the lateral edges of the extension being in the form of inwardly bent forwardly extending tabs, the tabs forming the integral arms, the tabs and the guide plates being respectively pinned together along a common axis to form the hinge, the third arm being formed as a projecting portion of the extension on the cover plate.

4. The combination as claimed in claim 3 in which the pair of arms are of the same length and constructed as mirror images of one another, with the third arm being substantially longer than the pair of arms, integral therewith, and located centrally between them.

5. The combination as claimed in claim 1 in which the slots divide each of the guide plates into upper and lower portions, the lower portions being extended rearwardly beyond the upper portions to provide an exposed ledge for convenience in seating the bar of the catcher evenly against the operating surfaces of the arms as a first step in the attachment of the catcher and prior to sliding the bar into seated position at the bottom portions of the slots.

6. In a rotary mower assembly, the combination comprising a mower having an inverted housing containing a rotary blade with means on the housing for driving the blade, the housing having an edge and a discharge opening adjacent thereto, an arm projecting upwardly adjacent the discharge opening and presenting an operating surface substantially in the plane of the discharge opening, hinge means located at the edge of the housing for hingeing the arm for swinging movement between a first position and a second position, the first position being generally a vertical position, means for biasing the arm to its first position, a guide plate secured to the top of the housing adjacent the edge thereof and being in vertically extending position, the guide plate having an angled slot formed therein accessible from its outwardly disposed edge and extending inwardly and downwardly to a bottom position spaced inwardly of the hinge and substantially at hinge level, a grass catcher having a frame defining a mouth dimensioned to accommodate the discharge opening and including a support bar spaced forwardly from the mouth, the arm having a notch at its upper end, the notch being outwardly facing when the arm is in its first position, the notch being complementary to the bottom of the slot when the arm is in its second position so that when the bar on the catcher is registered with the slot and pressed forwardly therein the bar engages the operating surface on the arm at its first position and progressively swings the arm into its second position when the bar reaches the bottom of the slot where the bar is held captive in latched position between the notch and the bottom of the slot thereby attaching the grass catcher to the mower housing with the mouth adjacent to and aligned with the discharge opening.

7. The combination as claimed in claim 7 including a second slotted guide plate, the second guide plate being secured to the top of the housing adjacent the edge thereof and parallel to and spaced from the first guide plate, whereby the grass catcher bar in latched position is registered in the slot of each guide plate and the spaced apart guide plates provide side-to-side support to the grass catcher thereby preventing tilting movement of the grass catcher about the longitudinal axis of the catcher.

* * * * *

UNITED STATES PATENT AND TRADEMARK OFFICE
CERTIFICATE OF CORRECTION

PATENT NO. : 4,214,424

DATED : July 29, 1980

INVENTOR(S) : Donald L. Gobin

It is certified that error appears in the above-identified patent and that said Letters Patent is hereby corrected as shown below:

Col. 5, line 51, change "claim 1" to --claim 2--;

Col. 6, line 49, change "claim 7" to --claim 6--.

Signed and Sealed this

Sixteenth Day of August 1983

[SEAL]

Attest:

GERALD J. MOSSINGHOFF

Attesting Officer     Commissioner of Patents and Trademarks